July 27, 1954
O. J. ALVAREZ
2,684,624
COFFEE MAKER
Filed Jan. 6, 1950
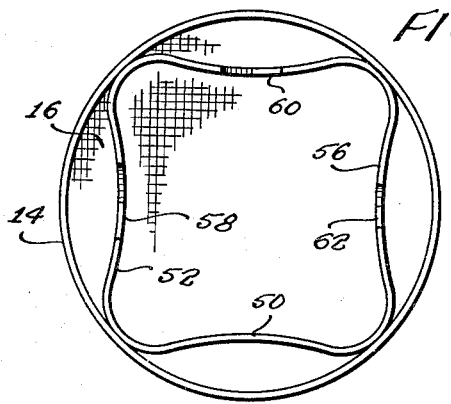
FIG.1
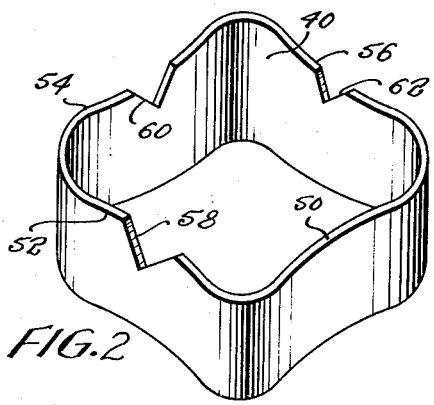
FIG.2
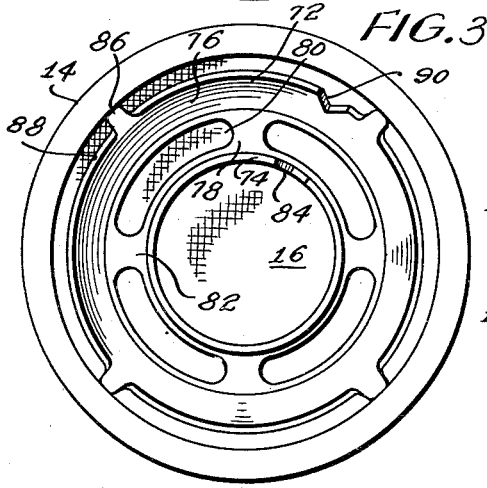
FIG.3
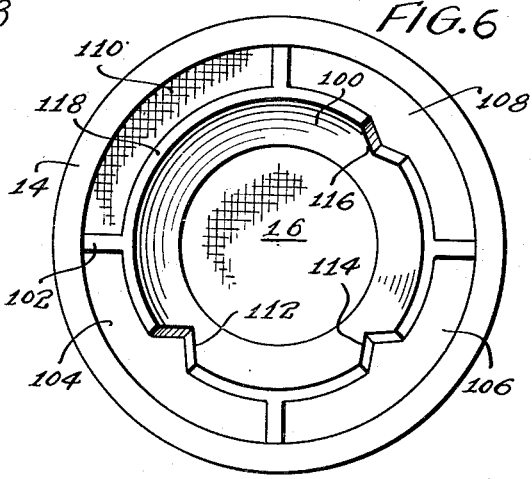
FIG.6
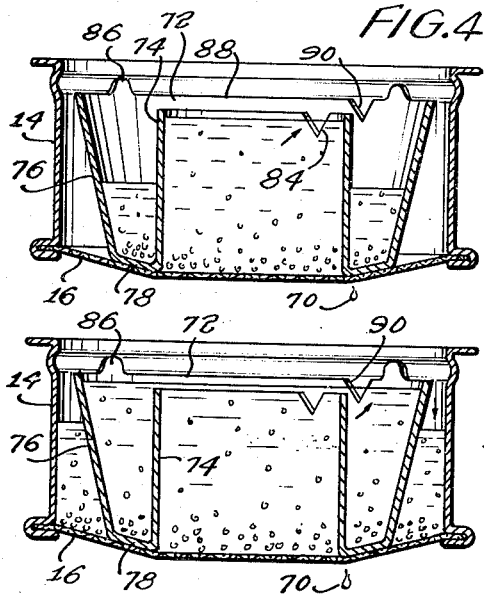
FIG.4
FIG.5
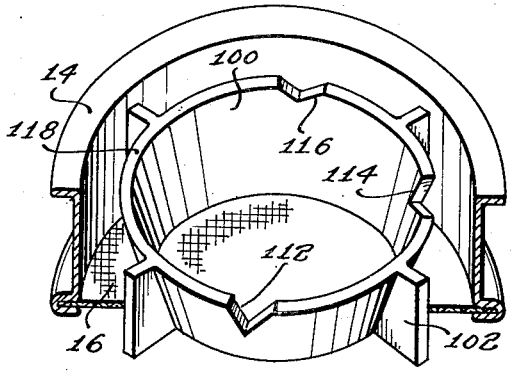
FIG.7
INVENTOR.
Octavio Jose Alvarez
BY Patented July 27, 1954

2,684,624

UNITED STATES PATENT OFFICE 2,684,624

COFFEE MAKER

Octavio Jose Alvarez, New York, N. Y., assignor to Alvarez Patent Corporation, New York, N. Y.

Application January 6, 1950, Serial No. 137,117

5 Claims. (Cl. 99—298)

The present invention relates to a coffee maker and more particularly to a coffee maker of the drip type, in which water is poured on ground coffee particles, is left to penetrate between the particles and is finally strained off.

It is an object of the present invention to provide a coffee maker of the type described which allows a perfect and complete extraction of the aromatic components from the ground coffee particles.

It is another object of the present invention to provide a coffee maker of the type described which allows to strain the coffee mixture in a relatively short time.

It is a further object of this invention to provide a coffee maker which allows to prepare greatly varying numbers of cups of coffee, for instance, from one to six cups.

It is still another object of the present invention to provide a coffee maker above described which is easy to take apart and simple to clean.

It is a still further object of the present invention to provide a coffee maker of the type described which is inexpensive to manufacture.

A coffee maker according to the present invention comprises in its broadest aspect a first container having a first strainer forming the bottom of the first container, the first container being adapted to receive ground coffee particles and water, a second container having a second strainer forming the bottom of the second container, and an overflow arranged in the wall of the first container and leading to the second container whereby part of the mixture of water and coffee particles in the first container flows over to the initially empty second container and is freed from coffee particles by the second strainer. Preferably the second container has a larger cross section than the first container and surrounds same. The second strainer may be arranged at a distance below the first strainer or be arranged on the same level with the first strainer. In the latter case the two strainers may be made in one piece.

An embodiment of the present invention comprises a container, a strainer forming the bottom of the container, and a baffle extending substantially at right angles to the strainer and subdividing the container so as to define two parts thereof, the baffle having an upper edge forming an overflow for part of the mixture of water and coffee particles present in one of the parts to flow over to the initially empty other part where it is freed from coffee particles by the strainer. Preferably, an overflow is arranged at the upper edge of the baffle, and preferably two indentations are arranged in the wall of the container substantially at right angles to the strainer for holding the baffle in position.

Another embodiment of the present invention comprises a first container, a strainer forming the bottom of the first container, a second container having a smaller cross section than the first container and having open upper and lower ends, and an overflow arranged at the upper end of the second container, the second container being placed inside the first container so that part of the mixture of water and coffee particles present in the second container overflows to the initially empty space between the first container and the second container where it is freed from coffee particles by the strainer. The second container may have a substantially elliptical wall having its major axis substantially equal to the diameter of the circular wall of the first container.

According to another embodiment of the invention the second container is substantially four-sided and has overflows of gradually increasing depth arranged at the upper ends of the sides of the second containers.

Another embodiment of the present invention comprises a container having a wall having an upper edge, a strainer forming the bottom of the container, an inset arranged in the container, the inset including an inner wall having an upper edge, an outer wall having an upper edge, and a bottom portion connecting the inner wall and the outer wall, the upper edge of the inner wall being preferably arranged at a lower level than the upper edge of the outer wall arranged at a lower level than the upper edge of the wall of the container, whereby part of the mixture of ground coffee particles and water filled into the space enclosed by the inner wall of the inset flows over into the space between the inner wall and the outer wall of the inset, whereas part of the mixture of ground coffee particles and water present in the space between the inner wall and the outer wall of the inset flows over into the space between the outer wall of the inset and the wall of the container where it is freed of coffee particles by the strainer. Preferably the strainer bulges downwards towards the center thereof. The bottom portion of the inset has preferably apertures for part of the coffee to be strained off through the apertures. Preferably overflows are provided in the upper edges of the inset leading from the innermost compartment thereof into the outermost compartment and from the outermost compartment to the space between the inset and the container. Preferably the container is cylindrical whereas the outer wall is conical and provided with projections being adapted to abut against the cylindrical wall of the container.

Another embodiment of the invention comprises in combination a container having a wall having an upper edge, a strainer forming the bottom of the container, a vessel having open lower and upper ends, the vessel having a smaller cross section than the container and being adapted to be arranged in the container so that part of the container forms the bottom of the vessel, and overflows of gradually increasing depth arranged at the upper end of the vessel.

Preferably partition walls are arranged on the outside of the vessel which divide the space between the vessel and the compartments and the overflows connect the interior of the vessel to the compartments, respectively. Alternatively the partition walls can have different heights and only one overflow connects the interior of the vessel to the empty space between the vessel and the container, the overflow being arranged between the distance pieces having the largest and the smallest height.

Another embodiment of the present invention comprises in combination a container having an open upper end, a strainer forming the bottom of the container, a vessel having open upper and lower ends and a smaller cross section than the container, the vessel being adapted to be placed in the container, a baffle arranged in the vessel and subdividing same into two compartments, an opening in the baffle in the lower portion thereof and connecting the compartments with each other, and an overflow arranged in the wall of the vessel and connecting the smaller one of the compartments to the space between the vessel and the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a plan view of still another embodiment of the present invention;

Fig. 2 is a perspective view of a part of the coffee maker shown in Fig. 1;

Fig. 3 is a plan view of another embodiment of the present invention;

Figs. 4 and 5 are sections of Fig. 3 showing the operation of the device;

Fig. 6 is a plan view of another embodiment of the invention; and

Fig. 7 is a perspective view of the embodiment shown in Fig. 6, with the container partly cut away.

Referring now to the drawings and first to Fig. 1, showing the principle of the present invention, the coffee maker comprises a first container 40 having an open upper end, a second container 14 also open at its upper end and arranged to surround the first container 40 and a strainer 16 forming the bottom of the second container 14. The second container 14 is preferably cylindrical and strainer 16 carries the first container 40. The first container 40 is provided with overflow means as described below.

The operation of this device is in general as follows: Ground coffee is put into the first container 40 and water is allowed to drip on said coffee. The coffee is strained off through the strainer 16 but the ground coffee particles prevent the quick straining of the coffee through the strainer 16. In consequence thereof a mixture of ground coffee particles and water is present in the container 40 which finally overflows the upper edge of said container and flows downward into the container 14 and on the strainer 16. Here the coffee is strained and is collected in the jar arranged underneath the container 14. In order to clean the coffee maker the containers 40 and 14 have to be emptied but the coffee particles accumulated in the container 14 are relatively few and loosely packed.

As is evident from Figs. 1 and 2, in this embodiment the container 40 forms a substantially four-sided body with sides 50, 52, 54, and 56. The wall of side 50 has an upper edge which is straight whereas the upper edges of the other sides are provided with overflows or notches 58, 60 and 62 of different depths, notch 62 having the smallest depth and notch 58 the largest depth. The diagonal of the four-sided figure formed by the cross section of the container 40 substantially equals the diameter of the circular wall of the container 14.

This embodiment allows to prepare any number of cups of coffee between one and six. If it is desired to make only one or two cups of coffee, hot water is allowed to drip on ground coffee in the interior of the second container 40 from where it is strained off through the strainer 16.

If three cups are wanted, more ground coffee and water are used and the water will overflow over the deepest notch 58 of the container 40 so that the corresponding space between the containers 14 and 40 is partly filled with a mixture of hot water and ground coffee particles. If four cups are wanted, correspondingly greater amounts of materials are used and the water flows over also at the second notch 60 thus reaching the adjoining space between the containers. For five cups the third notch 62 and the adjoining space between the containers come into action and for six cups the water flows also over the edge 50 of the container 40 so that all four intermediate spaces between the containers are in use. If desired, some ground coffee can be placed into the intermediate spaces from the very beginning and is wetted by the overflowing water.

This embodiment is inexpensive to make and very easy to clean since the container 40 needs practically only a slight rinsing with water and the container 14 and the strainer 16 need a rinsing from the reversed side in order to remove the coffee residue.

Referring now to Figs. 3-5, again a container 14 having a strainer 16 as its bottom is provided. Preferably the strainer 16 is bulging downwards towards the center thereof so that the drops on the underside of the strainer slide along the inclined surface of the strainer to the center and drop off there, as indicated at 70 in Figs. 4 and 5. In the preferably cylindrical container 14 is arranged an inset 72 including a preferably cylindrical inner wall 74, a preferably conical outer wall 76 and a bottom portion 78 connecting the walls 74 and 76. The bottom portion 78 has the shape of a ring or annulus and is provided with apertures 80 practically filling the hole of the annulus and only leaving some bridge portions such as 82 between one another. The cylindrical inner wall 74 of the inset 72 is provided with an overflow or notch 84 and preferably the height of the inner wall 74 is less than the height of the outer conical wall 76 of the inset 72 which is provided with projections such as 86 at its upper edge 88 which are adapted to abut against and extend partly into a circular groove of the cylindrical wall of the container 14, thus holding the inset 72 in position. The conical outer wall 76 is provided with an overflow or notch 90 at its upper edge 88.

The operation of this device is as follows:

Ground coffee particles and hot water are introduced into the interior of the cylindrical wall 74 of the inset 72 where the coffee is strained off through the strainer 16. If more coffee is required, more coffee particles and water are introduced into the interior of the cylindrical wall 74 and part of the mixture of water and coffee particles flows over through the notch 84 into the annular space between the walls 74 and 76 of the inset 72 as shown in Fig. 4. Here the coffee strains off through the apertures 89 in the bottom portion of the inset 72 and the strainer 16. If it is desired to prepare still more coffee, so much coffee particles and water are introduced into the interior of the cylindrical wall 74 of the inset 72 that the water fills the entire space inside the outer conical wall 76 of the inset 72 and flows partly over through the notch 90 into the space between the conical outer wall 76 of the inset 72 and the cylindrical wall of container 14 as shown in Fig. 5 from where it is strained off through the strainer 16.

Referring now to Figs. 6 and 7, the cylindrical container 14 accommodates a preferably conical vessel or inset 100 which is provided with separation walls 102 on its outer circumference which hold the vessel 100 in position within the container 14, and subdivide the space between the vessel 100 and the container 14 into a number of preferably equal compartments, for instance four compartments 104, 106, 108 and 110 as shown in the drawings. The interior of the vessel 100 is connected to the compartments 104, 106 and 108 by overflows or notches 112, 114 and 116, respectively, of gradually decreasing depth and the compartment 110 is connected to the interior of the vessel 100 by the straight upper edge 118 of the vessel.

The operation of this device is as follows:

If only one or two cups of coffee are required a corresponding amount of ground coffee is placed into the interior of the vessel 100 and water allowed to drip over it. For three cups of coffee the compartment 104 and the overflow 112 come into action, for four cups in addition the compartment 106 and the overflow 114, whereas for five cups the three compartments 104, 106 and 108 are in operation, and for six cups all four compartments, 104 to 110 in addition to the interior of the vessel 100.

It will be understood that each of the elements described above, or two or more together, may also find a useful application in other types of coffee makers differing from the types described above.

While I have illustrated and described the invention as embodied in coffee makers of the drip type, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A coffee maker comprising, in combination, a container having an outer side wall forming an open top and being provided with a bottom wall in the form of a screen; and a tubular member located symmetrically within said container with the bottom edge of said tubular member located on said bottom wall and with the top edge portion of said tubular member located beneath the level of the top end of said container, said top edge portion of said tubular member being formed with a plurality of notches of different depths, respectively, distributed about said tubular member so that water overflowing from said tubular member will be successively directed to different portions of said screen on the outside of said tubular member.

2. A coffee maker comprising, in combination, a container having an outer side wall forming an open top and being provided with a bottom wall in the form of a screen; a tubular member located symmetrically within said container with the bottom edge of said tubular member located on said bottom wall and with the top edge portion of said tubular member located beneath the level of the top end of said container, said top edge portion of said tubular member being formed with a plurality of notches of different depths, respectively, distributed about said tubular member so that water overflowing from said tubular member will be successively directed to different portions of said screen on the outside of said tubular member; and a plurality of partitions located on the outside of said tubular member respectively between said notches thereof and extending across said bottom wall of said container to said outer side wall thereof to form with the latter a plurality of independent compartments respectively communicating with said notches.

3. A coffee maker comprising, in combination, a container having an outer side wall forming an open top and being provided with a bottom wall in the form of a screen; and a tubular member located within said container with the bottom edge of said tubular member located on said bottom wall and with the top edge of said tubular member located in the region of the level of the top end of said container, said top edge of said tubular member being formed with a plurality of top edge portions of different elevations, respectively, distributed about said tubular member so that water overflowing from said tubular member will be successively directed to different portions of said screen on the outside of said tubular member.

4. A coffee maker as defined in claim 3 and wherein said tubular member is provided with a plurality of annularly spaced outer surface portions alternating with said top edge portions of said tubular member, each of said annularly spaced outer surface portions extending along the length of said tubular member and engaging the inner surface of said outer side wall of said container and said tubular member being inwardly spaced from said outer side wall between each pair of successive outer surface portions of said tubular member so that said tubular member defines with said outer side wall of said container a plurality of compartments to which water will overflow.

5. A coffee maker comprising, in combination, a container having an outer side wall forming an open top and being provided with a bottom wall in the form of a screen; a tubular member located within said container with the bottom edge of said tubular member located on said bottom wall and with the top edge of said tubular member located in the region of the level of the top end of said container, said top edge of said tubular member being formed with a plurality of top edge portions of different elevations, respectively, distributed about said tubular member so that water overflowing from said tubular member will be successively directed to different portions of said screen on the outside of said tubular member; and a plurality of partitions located on the outside of said tubular member respectively between said top edge portions thereof and extending across said bottom wall of said container to said outer side wall thereof to form with the latter a plurality of independent compartments respectively communicating with said top edge portions.

References Cited in the file of this patent

UNITED STATES PATENTS

| Number | Name | Date |
|---|---|---|
| 166,120 | Malin | July 27, 1875 |
| 227,805 | Matthes | May 18, 1880 |
| 542,731 | Halstead | July 16, 1895 |
| 767,595 | Pike | Aug. 16, 1904 |
| 951,290 | Selg | Mar. 8, 1910 |
| 1,046,013 | Ramsey | Dec. 3, 1912 |
| 1,431,603 | Sprague | Oct. 10, 1922 |
| 1,678,543 | Watson | July 24, 1928 |
| 1,778,792 | Cameron | Oct. 21, 1930 |
| 1,905,350 | Page | Apr. 25, 1933 |
| 2,020,104 | Collin | Nov. 5, 1935 |
| 2,052,476 | Koch | Aug. 25, 1936 |
| 2,103,780 | Hadley | Dec. 28, 1937 |
| 2,383,144 | Moore | Aug. 21, 1945 |

FOREIGN PATENTS

| Number | Country | Date |
|---|---|---|
| 385,230 | France | May 5, 1908 |